(12) United States Patent
Hermes et al.

(10) Patent No.: US 9,080,395 B2
(45) Date of Patent: Jul. 14, 2015

(54) CONNECTION MECHANISM

(75) Inventors: Stefan Hermes, Lennestadt (DE); Sebastian Fischer, Lennestadt (DE)

(73) Assignee: TRACTO-TECHNIK GmbH & Co. KG, Lennestadt (DE)

( * ) Notice: Subject to any disclaimer, the term of this patent is extended or adjusted under 35 U.S.C. 154(b) by 264 days.

(21) Appl. No.: 13/536,152

(22) Filed: Jun. 28, 2012

(65) Prior Publication Data

US 2013/0164081 A1    Jun. 27, 2013

(30) Foreign Application Priority Data

Jun. 29, 2011  (DE) .......................... 10 2011 107 348

(51) Int. Cl.
| | | |
|---|---|---|
| *B25D 17/04* | (2006.01) | |
| *E21B 17/043* | (2006.01) | |
| *F16B 7/18* | (2006.01) | |
| *F16D 1/08* | (2006.01) | |

(52) U.S. Cl.
CPC ................ *E21B 17/043* (2013.01); *F16B 7/182* (2013.01); *F16D 1/0876* (2013.01); *Y10T 403/587* (2015.01); *Y10T 403/68* (2015.01); *Y10T 403/7021* (2015.01)

(58) Field of Classification Search
CPC ... F16B 33/02; E21B 17/0426; E21B 17/043; F16L 15/001
USPC ......... 403/306, 319, 355, 356, 365, 318, 376, 403/377, 378, 380; 464/182; 175/320
See application file for complete search history.

(56) References Cited

U.S. PATENT DOCUMENTS

| | | | |
|---|---|---|---|
| 1,487,489 A | | 3/1924 | Streda |
| 3,073,635 A | | 1/1963 | Schaefer |
| 3,279,835 A | | 10/1966 | Krohm |
| 3,356,393 A | | 12/1967 | Casanov |
| 3,442,536 A | * | 5/1969 | Fowler ............................ 285/27 |
| 3,830,577 A | | 8/1974 | Rampe et al. |
| 4,240,652 A | | 12/1980 | Wong et al. |
| 4,363,603 A | | 12/1982 | Petersen |
| 4,426,105 A | | 1/1984 | Plaquin et al. |
| 4,444,421 A | | 4/1984 | Ahlstone |
| 4,767,310 A | | 8/1988 | Neumann et al. |
| 4,799,844 A | | 1/1989 | Chuang |
| 4,902,047 A | | 2/1990 | Marietta et al. |
| 5,060,740 A | | 10/1991 | Yousef et al. |
| 5,480,196 A | * | 1/1996 | Adams, Jr. ..................... 285/369 |
| 5,544,993 A | | 8/1996 | Härle |
| 5,980,157 A | | 11/1999 | Püttman |
| 6,520,547 B2 | | 2/2003 | Robinson |
| 6,981,547 B2 | * | 1/2006 | Maguire et al. ............ 166/242.7 |
| 7,559,582 B2 | * | 7/2009 | Evans et al. ................... 285/333 |

(Continued)

FOREIGN PATENT DOCUMENTS

| | | |
|---|---|---|
| CA | 845393 A1 | 6/1970 |
| DE | 2654150 A1 | 6/1978 |

(Continued)

*Primary Examiner* — Daniel P Stodola
*Assistant Examiner* — Jonathan Masinick
(74) *Attorney, Agent, or Firm* — Howard IP Law Group, PC

(57) ABSTRACT

A connection mechanism has a drive section with a thread on one end and is constructed as a sleeve. A shaft element having a thread matching the thread of the drive section can be screwed together with the drive section. At least one interlocking element forming an interlock with the sleeve is provided in addition to the thread.

11 Claims, 4 Drawing Sheets

(56) References Cited

U.S. PATENT DOCUMENTS

| | | |
|---|---|---|
| 7,954,225 B2 * | 6/2011 | Webb .................. 29/525.01 |
| 8,136,216 B2 * | 3/2012 | Evans et al. .................. 29/456 |
| 8,690,200 B1 | 4/2014 | Patterson, Jr. |
| 2003/0016418 A1 | 1/2003 | Westbrook et al. |
| 2003/0166418 A1 | 9/2003 | Wentworth et al. |
| 2006/0078372 A1 | 4/2006 | Kanflod et al. |
| 2008/0012320 A1 | 1/2008 | Evans et al. |
| 2008/0099242 A1 | 5/2008 | Tjader |
| 2011/0168286 A1 | 7/2011 | Koch |
| 2011/0200413 A1 | 8/2011 | Hermes et al. |

FOREIGN PATENT DOCUMENTS

| | | |
|---|---|---|
| DE | 236 138 A1 | 5/1986 |
| DE | 19608980 A1 | 9/1997 |
| DE | 19803304 A1 | 12/1998 |
| EP | 0324442 A1 | 7/1989 |
| EP | 0660004 A1 | 6/1995 |
| EP | 0928668 A2 | 7/1999 |
| GB | 207722 A | 12/1923 |
| WO | WO2006/092649 A1 | 9/2006 |
| WO | WO 2010028809 A2 * | 3/2010 |

* cited by examiner

CONNECTION MECHANISM

CROSS-REFERENCES TO RELATED APPLICATIONS

This application claims the priority of German Patent Application, Serial No. 10 2011 107 348.9, filed Jun. 29, 2011, pursuant to 35 U.S.C. 119(a)-(d), the content of which is incorporated herein by reference in its entirety as if fully set forth herein.

BACKGROUND OF THE INVENTION

The present invention relates to a connection mechanism, in particular for an earth-working machine.

The following discussion of related art is provided to assist the reader in understanding the advantages of the invention, and is not to be construed as an admission that this related art is prior art to this invention.

The term "earth-working machine" refers according to the invention to machines transferring drive power from a drive system via a rod assembly to a tool arranged on a rod assembly. In particular, these machines include earth boring machines configured to introduce subsurface boreholes and in particular horizontal boreholes into the ground. Typically, thrust forces or pressure forces and a drive torque are transmitted via the rod assembly of the earth boring machine to the tool constructed as a drill head. However, earth-working machines also exist where only thrust forces or pulling forces are transferred via the rod assembly to a corresponding tool. These include, in particular, those earth-working machines with which existing boreholes in the ground or already installed old conduits can be expanded or pulled out, wherein optionally a new pipe can be pulled in at the same time. The earth-working machines are frequently also configured so that they can be used both for creating the subsurface boreholes as well as for pulling work, i.e. for expanding an existing borehole or an old conduit and/or for pulling in the new pipe. It then becomes possible to first create a pilot borehole with the same earth-working machine, wherein a pilot drill head is pushed through the ground until it reaches a destination pit, and the pilot drill head is replaced in the destination pit by an expansion head, wherein the pilot bore hole is expanded when the rod assembly is pulled back. Optionally, a new pipe attached to the expansion head can be pulled into the expanded subsurface borehole simultaneously with the expansion head.

The term "drive section" according to the invention refers to an extension or a plug and/or screw element for a drive, for example a linear motor or a rotary motor, of a machine, in particular an earth-working machine. The drive section may, for example, be a connection element screwed onto a drive shaft of a rotary motor. The drive may produce the thrust, pressure and pulling forces as well as a rotational force or a rotational torque required for operating the machine. The pulling force is required, for example, wherein a new pipe is pulled in with an earth-working machine. Transmitting a torque is important, for example, with an earth boring machine in the technical field of horizontal drilling.

The rod assembly of such earth-working machines is usually formed of a plurality of rod sections which are sequentially connected with one another during the drilling advance. The individual rod sections are connected with coupling elements, wherein in addition to plug couplings, as described in DE 196 08 980 A1, in particular screw connections are frequently used. Screw connections have the significant advantage of low manufacturing costs and the option to form the screw connections automatically. However, screw connections have a significant disadvantage in that they frequently represent the weakest points of the rod assembly, due to the relatively small diameter in the region of the threaded plug of the threaded connection and the geometry-related large notch effect of the thread itself.

Conventional types of threads most frequently used for rod assemblies of earth-working machines are API threads and round threads according to DIN 20 400. The useful life of such thread shapes, however, has turned out to be too short for day-to-day operations of the earth-working machines.

It would therefore be desirable and advantageous to obviate prior art shortcomings and to provide an improved connection with an improved lifetime, which has an increased lifetime in particular when used for connecting a drive section with a shaft element of a rod assembly of an earth-working machine, and which in addition to the increased lifetime simultaneously allows rapid change, i.e. rapid detachment and attachment, of the elements to be connected.

SUMMARY OF THE INVENTION

According to one aspect of the present invention, a connection mechanism includes a drive section, a shaft element and at least one interlocking element. The drive section includes a thread and is formed as a sleeve. The shaft element has a thread that is complementary to the thread of the drive section and can be screwed together with the drive section. Furthermore, at least one interlocking element forming an interlock with the sleeve is provided in addition to the thread. The forces to be transmitted can thereby be separated. Whereas pressing and/or pulling forces are transmitted via the thread, torque is transmitted via the at least one interlocking element.

The core of the invention is therefore that a pulling and/or pressing force is transmitted via the thread, whereas the torque is transmitted via at least one interlocking element of the connecting device. According to the invention, a clear separation of the forces to be transmitted is achieved with the connecting device. The at least one interlocking element is capable of transmitting a torque, wherein the at least one interlocking element also provides a kind of "self-locking" which prevents rotation or slippage of the connected elements. The thread is therefore not stressed when transmitting a torque, and the at least one interlocking element is also not stressed when transmitting a pulling and/or pressing force. A simple and/or conventional thread as well as an uncomplicated interlocking element of symbols designed can now be used because the transmitted forces are separated.

Surprisingly, it has been observed that a connection mechanism according to the invention can be used to connect a drive section constructed as a drill shaft adapter for a rod assembly of an earth-working machine, in particular an earth-working machine subjected to pressure, tension and impact, with the drive shaft of a rotary motor even in the technical field of an earth-working machine, meaning under severe environmental conditions where the connection is subjected to moisture and dirt. Should the at least one interlocking element wear out due to the stress during the rotation, then this interlocking element can be easily exchanged. The interlocking elements have a simple structure that can be easily manufactured using basic processes. Because the torque is transmitted via the at least one interlocking element, the thread for transmitting the pulling and/or pressure forces can be formed conventionally.

The term "sleeve" according to the invention refers to a component into which an additional component can be inserted or attached at least on one end. The sleeve can have at least partially a circular exterior circumference.

The term "shaft element" according to the invention refers to a component having a longitudinal axis extending in an operating direction of the earth-working machine—in the direction of the borehole—and with which, for example, a rod assembly of an earth-working machine can be connected. The shaft element can serve as a drill shaft adapter enabling connection of different rod assemblies or rod sections to the drive, wherein a "matched" connection for the rod assembly is provided on the free end. Accordingly, several exchangeable shafts elements of a connection mechanism may exist for the connection mechanism according to the invention which may differ in the configuration on the free end of the shaft element. In general, the shaft element has on the free end a thread for connecting to a rod assembly or a rod section. The thread on the free end of the shaft element is preferably designed as a conical thread to facilitate a simple and rapid screw connection of a rod section with the shaft element according to the invention, i.e. the thread roots and/or the thread crests of the shaft element on the free end define an envelope having a conical shape. Preferably, the cone angle is here between 3° and 5°. Cone angle refers here to the angle which is enclosed between the jacket and a line parallel to the longitudinal axis of the shaft element. Preferably, the shaft element is hollow or has a central channel for passing drilling fluid.

The term "interlocking element" according to the invention refers to an element which provides an interlock between the drive section and the shaft element. According to the invention, the interlocking element is attached to the shaft element or to the drive section and has, for forming the interlock, an outside dimension that matches an opening of the drive section and/or the shaft element. For producing the interlock, the interlocking element is thus attached to one of the two (connection) elements and engages in an opening of the other (connection) element.

According to an advantageous feature of the present invention, the drive section may have an interior thread and the shaft element a corresponding exterior thread, so that the shaft element is "guided" in the drive section, thereby providing adequate stability of the connection while reliably transmitting the effective forces. The stability of the connection increases the lifetime of the connection or of the connecting elements. In addition, a simple connection in an earth-working machine can be established on-site.

According to another advantageous feature of the present invention, the at least one interlocking element may be releasably attached to the shaft element, so that a worn-out interlocking element can be replaced. The elements to be connected, i.e. the drive section and the shaft element, may still be used and the exchange is limited to a component, i.e. the interlocking element, which can be readily manufactured.

According to an advantageous feature of the present invention, the longitudinal direction of the at least one interlocking element may enclose with the longitudinal axis of the shaft element an angle less than 20°, thereby increasing and optimizing the "contact surface" of the interlock for transmitting the torque. According to yet another advantageous feature of the present invention, the interlocking element may be rectangular; when the connection is formed, the longitudinal axis of the interlocking element may be aligned to be substantially parallel to the longitudinal axis of the shaft element, which produces a maximum "contact surface."

According to an advantageous feature of the present invention, the at least one interlocking element may be constructed as a filler element which may be inserted into a slotted through-hole formed in the sleeve and which may have a dimension adapted to a dimension of the slotted through-hole for forming the interlock. By making the groove continuous, the interlocking element can also be accessed from the outside even after the connection has been formed. The interlock can be released from the outside. To this end, the interlocking element can be removed from the slotted through-hole and pressed out of the slotted through-hole, for example against a force.

Advantageously, several slotted through-holes and interlocking elements may be provided for uniformly distributing the load when transmitting a torque. The wear of an interlocking element may be reduced by uniformly distributing the load over several interlocking elements. The lifetime of an individual interlocking element forming the connection may then also be increased. The lifetime may be increased further by uniformly distributing the several slotted through-holes about the circumference of the drive section. The slotted through-holes or interlocking elements may advantageously be spaced with equidistant angles.

According to an advantageous feature of the present invention, the at least one interlocking element may attached on the shaft element with a screw connection, i.e. the at least one interlocking element may be screwed together with the shaft element. The shaft element may have one or several (blind) holes with an interior thread, into which a screw which passes at least partially through the interlocking element transverse to the longitudinal direction can be screwed. With a screw connection, the at least one interlocking element may form a structurally simple releasable connection representing a secure and load-bearing connection. The interlock can be established by simple means and released again when the shaft element needs to be changed.

According to another advantageous feature of the present invention, the shaft element for the at least one interlocking element may have a recess adapted to the surface of the interlocking element and configured to secure the at least one interlocking element. By forming a recess in the shaft element that matches the interlocking element to which it is attached, contact surfaces can be created which extend transversely to the load direction when transmitting a torque and which are then able to absorb the forces acting on the interlocking element and/or support the interlocking element. The lifetime of the connection mechanism is further increased by reducing the load with the support.

For connecting the drive section to the drive, the drive section may advantageously have an additional threaded section for connection to the drive, wherein the additional threaded section is spaced from the threaded section—i.e. disposed on the other end. Advantageously, the drive section may also have on one side a toothed pattern that is spaced from the threaded section—a front-face toothing and/or a toothing formed about the outside circumference—for a drive, for example a drive shaft of a rotary motor.

According to an advantageous feature of the present invention, to design the threaded connection for pressure loads as well as for tension loads, the exterior thread of the shaft element and optionally the interior thread of the drive section and the thread on the free end of the shaft element of the connection mechanism according to the invention may be formed symmetrical. This may advantageously be achieved by forming adjacent flanks of a thread pitch of the shaft element as sections of the same ellipse. The elliptical shape of this one ellipse may also be further extended on the thread root so that both flanks and the thread root of a thread pitch form one and the same ellipse. With this design of the exterior thread of the shaft element, the stress from both a pressure load and a tension load can be particularly uniformly distributed. In a corresponding interior thread of the drive section and/or of the threaded bushing of a rod section to be connected with the shaft element, the two flanks of a thread profile may form sections of one of the same ellipse. However, the thread crest may advantageously have a flat shape.

According to another aspect of the invention, the connection mechanism according to the invention is particularly suited for connecting rod sections of a rod assembly of an earth-working machine with a drive of an earth-working machine which is particularly subjected to pressure, tension and impact, for example a horizontal boring machine which can also be used for pulling new pipes and/or widening pilot boreholes. Preferably, the individual rod sections are hereby connected with the shaft element on a free end of the shaft element.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
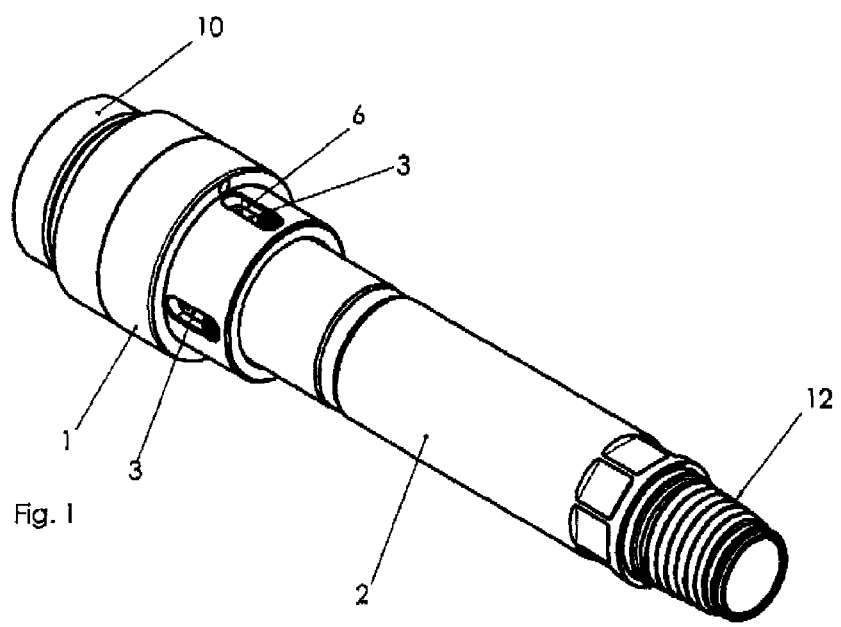
FIG. 1 shows a connection mechanism according to the present invention with a drive section and a shaft element in a schematic isometric view.
Figure 2:
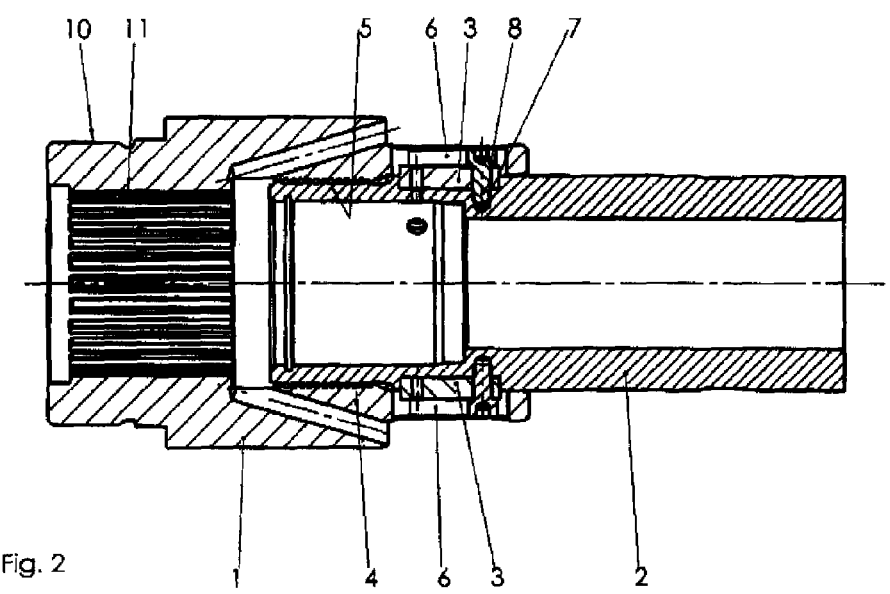
FIG. 2 shows an enlarged partial view of FIG. 1 in a longitudinal section.
Figure 3:
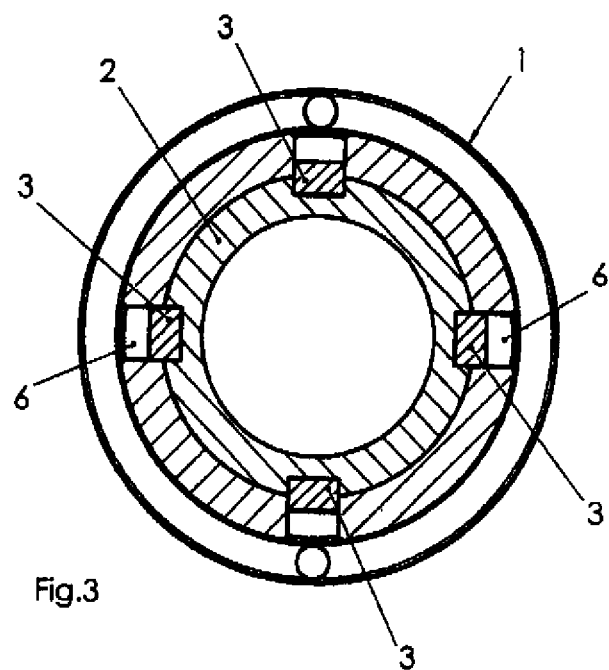
FIG. 3 shows a front view of FIG. 1 in an enlarged partial cross-section of an interlock formed in the region between the drive section and the shaft element.
Figure 4:
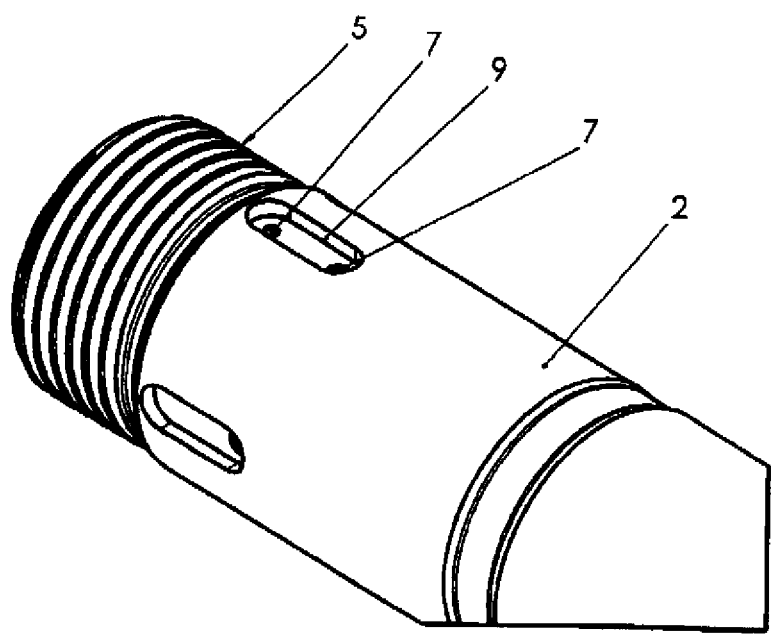
FIG. 4 shows an end of the shaft element of FIG. 1 in an enlarged view.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, FIGS. 1 to 4 show a connection mechanism according to the invention having three elements. The connection mechanism according to the invention includes a drive section 1 constructed as a sleeve, a shaft element 2 constructed as a drill shaft adapter, and at least one interlocking element 3.

The drive section 1 has a thread 4 constructed as an interior thread. The shaft element 2 has an exterior thread 5 constructed to correspond to the thread 4. The exterior thread 5 is formed on one side on the shaft element 2. The exterior thread 5 formed on one side of the shaft element 2 is screwed into the drive section 1 formed as a sleeve for forming a connection.

An interlock between the drive section 1 and the shaft element 2 can be created with the at least one interlocking element 3. The four interlocking elements 3 illustrated in the exemplary embodiment are attached on the shaft element 2. For forming the interlock, slotted through-holes 6 are formed in the drive section 1, in which the interlocking elements 3 can be inserted and attached to the shaft element 2. The slotted through-holes 6 are adapted to the outside shape, i.e. in particular the side faces of the interlocking elements 3, and form the interlock when in contact with the side faces. The interlocking elements 3 are attached to the shaft element 2 via a screw connection, with holes formed in the shaft element 2 and having an interior thread; screws 8 which pass through the interlocking elements 3 in the direction transverse to the longitudinal axis of the shaft element 2 are screwed into the interior thread of the shaft element 2.

A recess 9 is formed on the shaft element 2 for each interlocking element 3 in the region where the interlocking element 3 is attached to the shaft element 2. The recess 9 is dimensioned such that the side faces of the interlocking element 3 are form fittingly received in the recess 9.

In the illustrated exemplary embodiment, the slotted through-holes 6 are arranged uniformly about the circumference of the drive section 1 and/or the shaft element 2. The interlocking elements 3 have a thickness so as not to take up the entire height of the slotted through-holes 6, but to leave in the region of the slotted through-hole 6 an intermediate space between the surface of the interlocking element 3 and the outer surface of the drive section 1.

A thread and a toothing 11 are formed on the end side in form of an exterior thread 10 for connecting the drive section 1 with a drive. The drive section 1 can be placed with the toothing 11 on a driven shaft of a rotary motor to attain rotary coupling. The drive section 1 can be secured in the axial direction by installing a nut matching the exterior thread 10.

Figure 6:
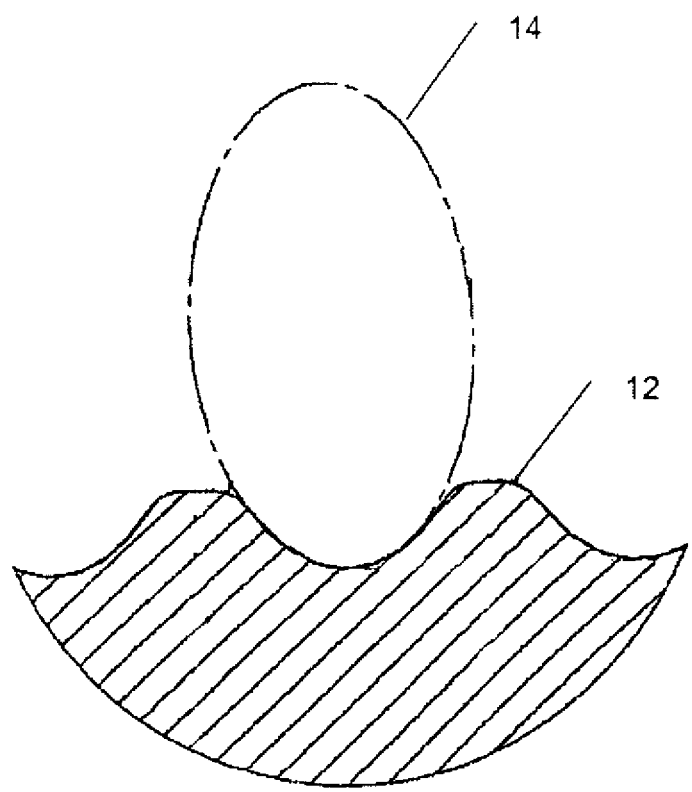
FIG. 6 is a partial cross-section view of symmetrical threads, wherein adjacent flanks and the thread root form sections of the same ellipse.

FIG. 1 shows that the shaft element 2 has on the free end, i.e. spaced from the drive section 1, a thread 12 with a symmetric exterior thread applied on a core, wherein adjacent flanks and the thread root of a thread pitch form segments of the same ellipse 14 (see FIG. 6).

Figure 5:
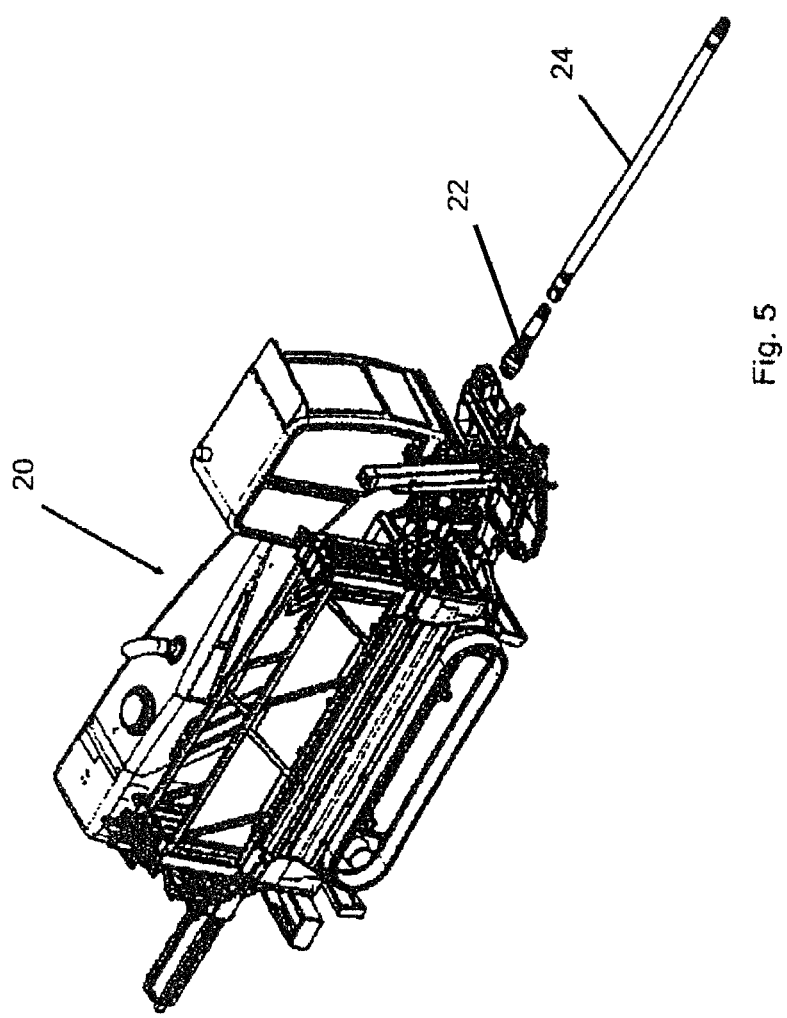
FIG. 5 shows schematically an earth-working machine which includes an integrated drive to be coupled to the connection mechanism of FIG. 1.

FIG. 5 shows in a schematic perspective view an earth-working machine 20 with a (not specifically shown) integrated drive to which the connection mechanism 22 according to the invention is coupled. FIG. 5 also indicates a rod assembly 24, or part of a rod assembly configured to be coupled to the end of the connection mechanism distal from the drive of the earth-working machine.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A connection mechanism comprising:
   a drive section constructed as a sleeve and having a thread,
   a shaft element having a thread corresponding to the thread of the drive section and configured to be screwed into the drive section, and at least one interlocking element releasably connected with the shaft element;

wherein the sleeve comprises at least one slotted through-hole defining an elongated opening extending in an axial direction of the sleeve, wherein the at least one interlocking element is configured for insertion into the at least one slotted through-hole and has a lateral dimension generally matching a transverse width of the at least one slotted through-hole, and wherein the elongated opening and the at least one interlocking element are sized so as to define a gap in the axial direction between ends of the at least one interlocking element and ends of the elongated opening such that no axial pressure load or axial tension load is placed on the at least one interlocking element during the transmitting of at least one of axial pressure and axial tension forces between the drive section and the shaft element.

2. The connection mechanism of claim 1, wherein the thread of the drive section comprises an interior thread and the thread of the shaft element comprises a corresponding exterior thread.

3. The connection mechanism of claim 1, wherein a longitudinal axis of the at least one interlocking element forms an angle of less than 20° with a longitudinal axis of the shaft element.

4. The connection mechanism of claim 1, wherein the at least one slotted through-hole comprises a plurality of slotted through-holes and the at least one interlocking element comprises a plurality of interlocking elements.

5. The connection mechanism of claim 4, wherein the plurality of slotted through-holes are uniformly distributed about a circumference of the drive section.

6. The connection mechanism of claim 1, wherein the at least one interlocking element is attached to the shaft element via a threaded fastener.

7. The connection mechanism of claim 6, wherein the shaft element comprises at least one recess adapted to a surface of the at least one interlocking element, with the at least one interlocking element affixable in the at least one recess via the threaded fastener.

8. The connection mechanism of claim 1, wherein the drive section comprises an exterior thread disposed on one end of the drive section.

9. The connection mechanism of claim 1, wherein the drive section comprises a toothed pattern disposed on one end of the drive section for connecting to a drive.

10. The connection mechanism of claim 1, wherein the shaft element comprises a second thread with a symmetric exterior thread disposed on a core on a free end of the shaft element, the symmetric exterior thread including adjacent flanks and a thread root between the adjacent flanks of a thread pitch, wherein the surface of the flanks and the thread root form a continuous elliptical shape.

11. An earth-working machine comprising:
a drive,
a drive section coupled to the drive and constructed as a sleeve and having a thread,
a shaft element constructed as a drill shaft adapter for a rod assembly of the earth-working machine, said shaft element having a thread corresponding to the thread of the drive section and configured to be screwed into the drive section, and
at least one interlocking element releasably connected with the shaft element;
wherein the sleeve comprises a slotted through-hole defining an elongated opening extending in an axial direction of the sleeve, wherein the at least one interlocking element is configured for insertion into the slotted through-hole and has a lateral dimension generally matching a transverse width of the slotted through-hole, and wherein the elongated opening and the at least one interlocking element are sized so as to define a gap in the axial direction between ends of the at least one interlocking element and ends of the elongated opening such that no axial pressure load or axial tension load is placed on the at least one interlocking element during the transmitting of at least one of axial pressure and axial tension forces between the drive section and the shaft element.

* * * * *